United States Patent [19]

May

[11] Patent Number: 4,653,213
[45] Date of Patent: Mar. 31, 1987

[54] LOW RESISTANCE NET-SUPPORTING FRAME ASSEMBLY

[76] Inventor: Billy D. May, 213 8th St., Port St. Joe, Fla. 32456

[21] Appl. No.: 716,748

[22] Filed: Mar. 27, 1985

[51] Int. Cl.⁴ .............................................. A01K 73/04
[52] U.S. Cl. .................................................... 43/9
[58] Field of Search .............................................. 43/9

[56] References Cited

U.S. PATENT DOCUMENTS

| 3,308,568 | 3/1967 | Luketa | 43/9 |
| 3,353,292 | 11/1967 | Luketa | 43/9 |
| 4,045,901 | 9/1977 | Prudenzi | 43/9 |

FOREIGN PATENT DOCUMENTS

| 252492 | 6/1926 | United Kingdom | 43/9 |
| 360808 | 11/1931 | United Kingdom | 43/9 |

Primary Examiner—Gene P. Crosby
Attorney, Agent, or Firm—Jones & Askew

[57] ABSTRACT

An end door for a trawling net has an open framework for clearance of debris and panel structure secured to the framework therebehind for providing the required resistance to keep the mouth of the net open while the trawl is under tow in fishing waters. The panelling deflects the water and debris laterally and rearwardly through a series of long, upright exits, thereby preventing deflection of the debris by the doors into the mouth of the net.

9 Claims, 7 Drawing Figures

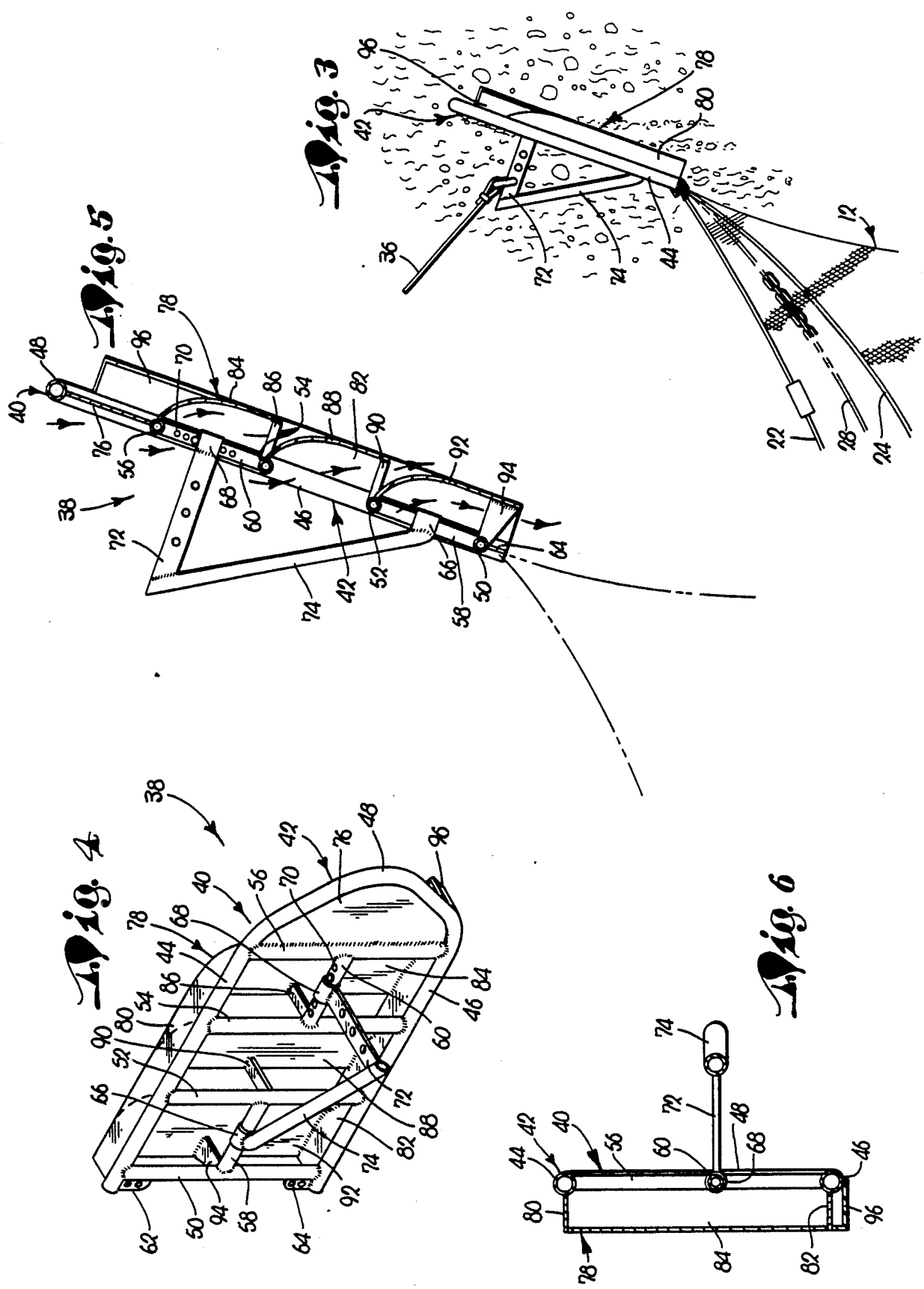

LOW RESISTANCE NET-SUPPORTING FRAME ASSEMBLY

BACKGROUND OF THE INVENTION

This invention relates to improvements in the end doors of the net of a fishing trawl for keeping the mouth of the net open as the doors are dragged along the beds of the fishing waters by a towing vessel.

In a common mode of commercial fishing known as trawling, the trawl includes a net which is pulled along the bottom of the fishing ground, such as in an inshore, shallow water fishery. The net is normally in the shape of a long, conical bag tapering from a wide, open, leading mouth to a smaller, trailing, fish-entrapping, bag-like end which is closed while fishing.

The net is dragged along the bottom by a pair of long towlines extending from the fishing craft to a pair of so-called resistance doors attached to the four corners of the mouth of the net. The relatively heavy doors, in their movement through the water, tend to sweep outwardly, as in a kite, stretching the net between the doors, thereby holding the net open.

A headrope, provided along the upper, arcuate, leading edge of the net carries a number of floats, and a footrope along the lower edge of the net is weighted with lead or other heavy substance. Towing of the trawl causes the doors to travel along the bed, riding on runners. By virtue of the presence of the floats and the drag or friction of the water passing through the meshes of the net, the tow of the net tends to belly upwardly. The lower part of the net remains close to the bottom by the action of the weighted footrope dragging along in contact with the bottom.

The upper, leading edge of the net advances through the water a little ahead of the footrope, thereby lessening the chances of the fish escaping over the top of the net. That is, by shortening the headrope, when fish on the bottom are disturbed by the approaching footrope, they dart upwardly and strike the top belly of the net which forms an apron over the fish which are swept back into the rear bag.

Conventional doors, for example 20" high, and weighing about 65 pounds, are made from 42" board planks, lighter at the top so that the center of gravity is near the runner which extends along the bottom plank and thence upwardly in an arc at the forward end of the door. Upright cross members joining the planks are used for attachment of adjustable towing chains of various lengths. A tickle chain is used between the doors ahead of the footrope to enhance the upward darting of the fish from the bed.

There are at least two primary drawbacks to those types of doors. First, they loosen and drag with them a substantial amount of debris and trash, including underwater vegetation, most of which is deflected into the net and oftentimes quickly fills the rear bag, thereby diminishing the size of the catch. Secondly, the drag is so substantial as to require boat horsepower and fuel comsumption which is much higher than is normally desired.

In accordance with my present invention therefore, the improved door includes an open, leading framework through which the extraneous materials pass quite readily and are, therefore, not deflected by the door into the net. Carried by the framework therebehind are a number of elongated, spaced, upright panels which provide the necessary resistance. The panels are transversely angled for lateral and rearward deflection of the water and debris which impinge thereon after passage through the framework. A curvature in each panel tends to smooth out the flow of the materials therealong without undue resistance toward the rear exits between the panels.

IN THE DRAWINGS

FIG. 4 is a top, front perspective view of one of the doors;

FIG. 5 is an essentially top plan view of the other door, partially in section, showing its relatitonship to the net and its attitude in the water when under tow;

FIG. 6 is a cross-sectional view showing details of construction; and

FIG. 7 is an enlarged, fragmentary rear elevational view of one of the doors at the leading end thereof remote from the net.

DESCRIPTION OF THE PREFERRED EMBODIMENT

Figure 2:
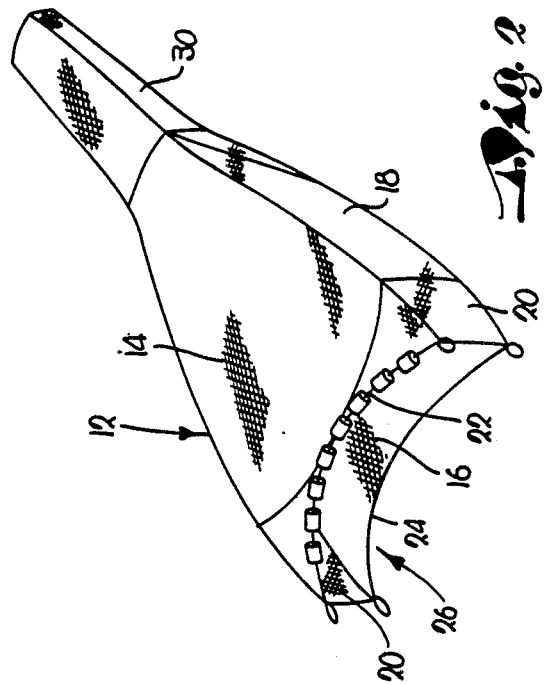
FIG. 2 is a perspective view of the net shown in FIG. 1.
Figure 3:
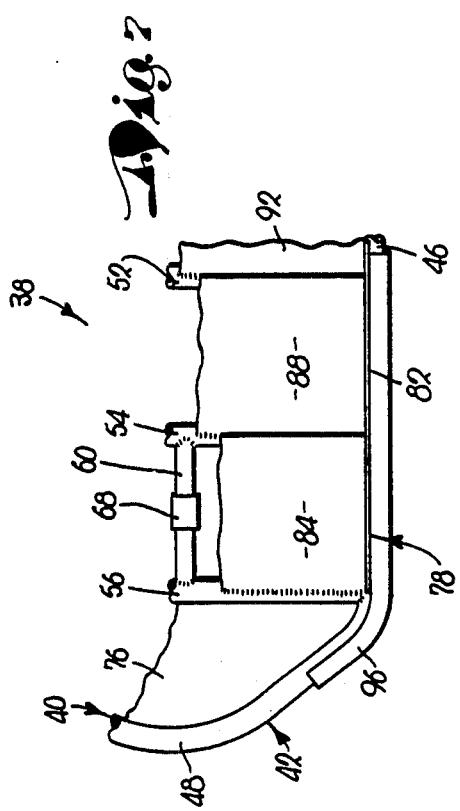
FIG. 3 is a top view of one of the doors, showing its relationship to the net and its attitude in the water when under tow.
Figure 1:
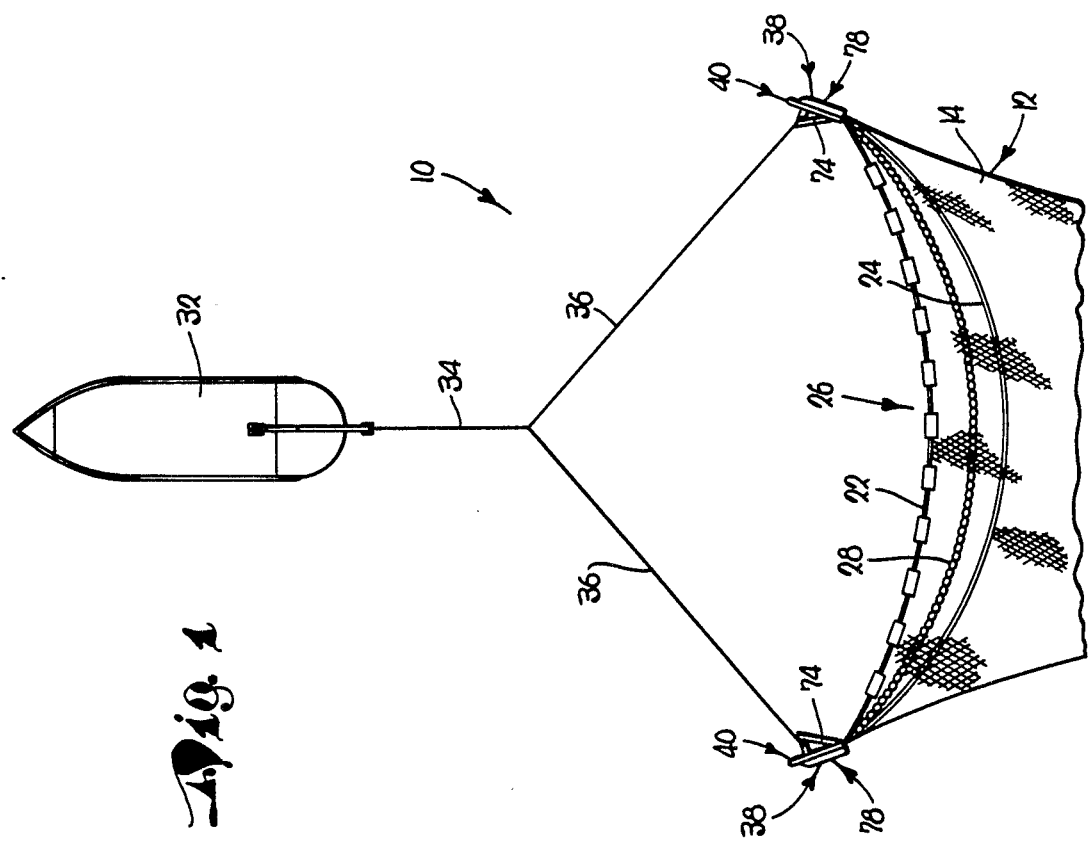
FIG. 1 is a plan view of a trawl under tow employing a pair of identical end doors made in accordance with my present invention.

A trawl 10 includes a net 12 provided with a top belly 14, a bottom belly 16, a pair of said belly wedges 18 and a pair of side wings 20. An upper headrope or cork line 22 and a lower footrope or leaded line 24 extend along a mouth 26 of the net 12. A tickle chain 28 is disposed in slight leading relationship to the footrope 24, and the rear end of a bag 30 at the apex of the net 12 is closed by a tying rope at its rear end during trawling. When the trawl 10 is towed by a vessel 32, through use of a tow line 34, having a pair of branches 36, the footrope 24 and the tickle chain 28 are dragged along in contact with the bed or bottom of the fishing waters.

Each metal end door 38 of the instant invention includes open, leading framework 40 having a U-shaped, tubular, main frame 42, presenting an elongated, upper leg 44, an elongated, lower leg 46 and an outer, arcuate bight 48. The legs 44 and 46 are rigidly interconnected by spaced, tubular uprights 50, 52, 54 and 56.

The uprights 50 and 52 are rigidly interconnected intermediate their ends by a tubular crosspiece 58 and the uprights 54 and 56 are rigidly interconnected intermediate their ends by a tubular crosspiece 60. Upper and lower, perforated brackets 62 and 64 are rigidly connected to the free, inner ends of legs 44 and 46 respectively and to the upright 50.

Collars 66 and 68 are rotatable on and slidable along the crosspieces 58 and 60 respectively, the crosspiece 60 having a series of spaced holes 70. A perforated bar 72 is rigidly connected to the collar 68 and a tube 74 rigidly interconnects the collar 66 and the bar 72. Upright pins in selected holes 70 limit the extent of sliding movement of the collars 66 and 68 along their crosspieces 58 and 60. The bight 48 and the upright 56 are rigidly joined by an upstanding wall 76.

Behind the frame 42 and secured thereto is debris-receiving structure 78 including an elongated top 80 transversely radial of and ridigly affixed to the leg 44, together with an elongated bottom 82 transversely radial of and rigidly affixed to the leg 46. The rearwardly extending top 80 and bottom 82 terminate at the free, inner ends of the legs 44 and 46 as well as at the upright 56 and wall 76.

Spanning the distance between and affixed to the top 80 and bottom is a series of upright, debris-deflecting panels having inner and outer longitudinal edges substantially coextensive in length with the distance between legs 44 and 46. A first panel 84 has its inner edge secured to the upright 56 and its outer edge spaced rearwardly of the upright 54. A strap 86 joins the upright 54 and the panel 84 at its outer edge. A second panel 88 has its inner edge secured to the upright 54 and its outer edge spaced rearwardly of the upright 52. A strap 90 joins the upright 52 and the panel 88 at its outer edge. A third panel 92 has its inner edge secured to the upright 52 and its outer edge spaced rearwardly of the upright 50. A strap 94 joins the upright 50 and the panel 92 at its outer edge. Adjacent the uprights 56, 54 and 52, the corresponding panels 84, 88 and 92 are transversely arcuate, presenting a smooth, forwardly-facing concavity against which the debris impinges for gradual deflection rearwardly and inwardly. Such extraneous material and water exit behind the panels 88 and 92 and along the proximal wings 20 and wedges 18 of the net 12.

A transversely, L-shaped, replaceable runner or wear shoe 96 for protecting the leg 46 and a portion of the bight 48 extends therealong below the bottom 82 and is secured to the leg 46, the bottom 82 and the bight 48.

The branches 36 of the towline 34 are connected to a selected perforation in the bar 72. The headrope 22 is connected to the brackets 62. The footrope 24 and the tickle chain 28 are connected to the brackets 64. The angularities of the doors 38 with respect to their direction of travel depends on the positions of the collars 66 and 68 along the crosspieces 58 and 60 and the points of attachment of the branches 36 to the bars 72.

In use of a trawl 10 with doors 38 having thirty inch heights and overall lengths of fifty feet during fishing for shrimp, I have been able to reduce fuel consumption by as much as 40–50% with a cost reduction from $6.00 per hour to $3.50 per hour. The catch was 60–70% cleaner and the total weight of the shrimp was increased from 75 pounds to 350 pounds in an appreciably shorter period of time than when using conventional board-type doors.

I claim:

1. A pair of end doors for keeping the mouth of the net of a fish gathering trawl open during use of the trawl, each door comprising:
   an elongated, open frame having means at one end thereof for attachment of said net thereto; and
   a plurality of elongated, generally upright, resistance panels secured to the frame therebehind in parallel alignment with said frame and each panel, said panels having a transversely arcuate portion to form a forwardly-facing concave surface and spaced apart for free flow, lateral and rearward deflection of extraneous materials through the frame away from the net as the trawl is towed through fishing waters with said frame advancing adjacent the bottom of said waters.

2. A pair of end doors for keeping the mouth of the net of a fish gathering trawl open during use of the trawl, each door comprising:
   an elongated, open frame having means at one end thereof for attachment of said net thereto, said frame having a number of uprights; and
   a plurality of elongated, generally upright, resistance panels secured to the frame therebehind, each panel having a longitudinal edge rigidly secured to a corresponding one of said number of uprights,
   said panels being spaced apart for free flow of extraneous materials through the frame as the trawl is towed through fishing waters with said frame advancing adjacent the bottom of said waters.

3. The invention of claim 2, each panel having a free, longitudinal edge spaced from the frame.

4. The invention of claim 2; and towline attaching apparatus shiftably carried by certain of said uprights forwardly thereof for predetermining the attitude of the door in relation to the direction of advancement of the trawl.

5. An end door for the net of a fishing trawl comprising:
   an open framework for free flow of debris therethrough,
   said frame including a main, U-shaped frame having an upper leg, a lower leg and a bight;
   a number of spaced uprights spanning the distance between the legs and rigidly secured thereto; and
   resistance means rigidly secured to each upright respectively therebehind and disposed to deflect the debris laterally and rearwardly as the trawl is advanced through fishing waters adjacent the bed thereof.

6. The invention of claim 5, each resistance means being an elongated, upright panel having its transverse axis extending rearwardly and laterally at an angle to the path of travel of the trawl.

7. The invention of claim 6, each panel having a free, longitudinal edge spaced rearwardly of the next adjacent upright.

8. The invention of claim 7, a top and a bottom extending rearwardly from said legs, the panels spanning the distance between and being rigidly secured to said top and said bottom.

9. The invention of claim 8; and a wear shoe secured to said lower leg.

* * * * *